United States Patent
Kim et al.

(10) Patent No.: US 7,580,190 B2
(45) Date of Patent: Aug. 25, 2009

(54) MICRO LENS ARRAY AND METHOD OF MANUFACTURING THE SAME

(75) Inventors: Kwang-hee Kim, Seoul (KR);
Chang-hoon Jung, Seoul (KR);
Young-gu Jin, Hwaseong-si (KR);
Byong-ho Cheong, Seoul (KR);
Hyuk-soon Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 377 days.

(21) Appl. No.: 11/448,113

(22) Filed: Jun. 7, 2006

(65) Prior Publication Data

US 2006/0286461 A1     Dec. 21, 2006

(30) Foreign Application Priority Data

Jun. 7, 2005     (KR) ...................... 10-2005-0048401

(51) Int. Cl.
*G02B 27/10*     (2006.01)
*B05D 5/06*     (2006.01)

(52) U.S. Cl. ...................... 359/620; 359/626; 359/619; 427/164

(58) Field of Classification Search ................. 264/1.32, 264/1.38; 359/454, 455, 456, 459, 460, 619, 359/620, 626; 427/162, 163.3, 164, 169
See application file for complete search history.

(56) References Cited

U.S. PATENT DOCUMENTS 6,814,901 B2 * 11/2004 Itoh ......................... 264/1.38
7,265,907 B2 *  9/2007 Hasei ....................... 359/619

FOREIGN PATENT DOCUMENTS

JP     2002-68755     3/2002

* cited by examiner

*Primary Examiner*—David N Spector
(74) *Attorney, Agent, or Firm*—Staas & Halsey LLP (57) ABSTRACT

A micro lens array and method of fabricating the micro lens array. The micro lens array includes: a substrate; a plurality of holes penetrating the substrate; and a plurality of lens units on a first surface of the substrate, each lens being at a respective one of the plurality of holes. When the micro lens array is applied to a display device, a high contrast ratio can be obtained, and the light can be transmitted in a single direction.

21 Claims, 9 Drawing Sheets

MICRO LENS ARRAY AND METHOD OF MANUFACTURING THE SAME

CROSS-REFERENCE TO RELATED APPLICATION

This application claims the benefit of Korean Patent Application No. 10-2005-0048401, filed on Jun. 7, 2005, in the Korean Intellectual Property Office, the disclosure of which is incorporated herein by reference.

BACKGROUND OF THE INVENTION

1. Field of the Invention

The present invention relates to a micro lens array and a method of manufacturing the same, and more particularly, a micro lens array that provides an increased viewing angle and a high contrast ratio by adjusting a light transmittance according to a light incident direction onto the micro lens array, and a method of manufacturing the micro lens array.

2. Description of Related Art

Figure 1A:
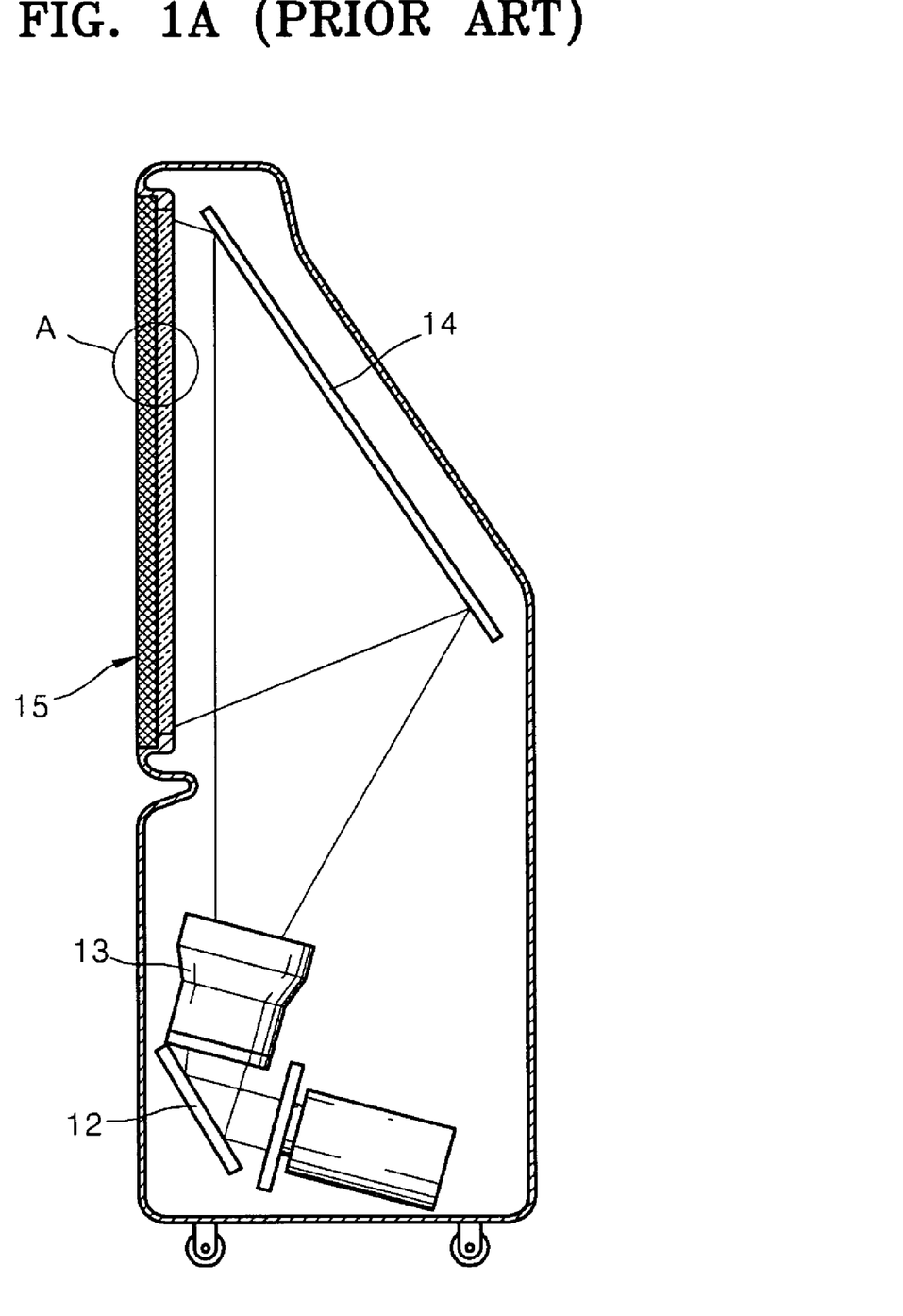
FIG. 1A is a view of a display device including a micro lens array according to the conventional art.

FIG. 1A is a view illustrating a conventional optical imaging apparatus, for example, a projection TV. The projection TV includes a reflection mirror between a projection light source and a screen to display a large image, which is projected from a projector and reflected by the mirror, on the screen. Referring to FIG. 1A, the conventional projection TV includes a liquid crystal display (LCD) panel emitting the light, a first mirror 12 located on the light path, a lens member 13, and a second mirror 14. The light reflected from the second mirror 14 is displayed through the screen 15.

Figure 1B:
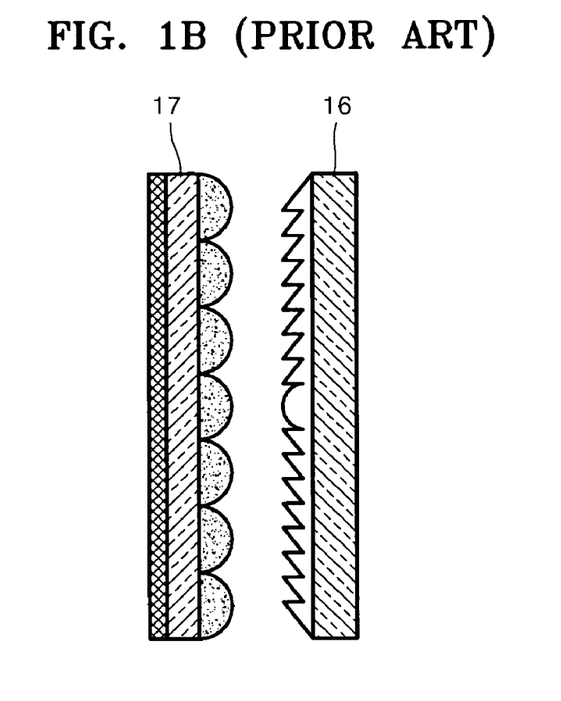
FIG. 1B is an enlarged cross-sectional view of part A of FIG. 1A.

FIG. 1B is an enlarged cross-sectional view of part A of the screen 15 of FIG. 1A. The screen 15 of the conventional projection TV includes a fresnel lens 16 and a lenticular lens 17 facing the fresnel lens 16. The lenticular lens 17 has an array structure including a transparent substrate and transparent lenses of semi-cylindrical shape formed on the transparent substrate. The lenticular lens 17 refracts the light reflected by the second mirror 14 to transmit the light to outside of the projection TV, and prevents the external light from entering into the projection TV using a light absorbing surface.

However, according to the structure of the conventional lenticular lens 17 of FIG. 1B, a visibility from all directions is not ensured, and the light absorbing surface of the lens is formed as stripe. Therefore, the viewing angle is narrow, and a contrast ratio is low.

BRIEF SUMMARY

An aspect of the present invention provides a micro lens array that can transmit light in a single direction and improve a contrast ratio, and a method of fabricating the micro lens array.

According to an aspect of the present invention, there is provided a micro lens array including: a substrate; a plurality of holes penetrating through the substrate; and a plurality of lens units on a first surface of the substrate, each lens being at a respective one of the plurality of holes.

The micro lens array may further include: a light absorbing layer formed on a second surface of the substrate opposite the first surface, except where the holes penetrate the substrate.

Each of the holes may have a diameter ranging from about 1 μm to 50 μm.

An interval between the holes formed in the substrate may be about 2-5 times greater than the diameter of each of the holes.

The lens unit may be formed of at least one selected from a group consisting of a polyurethane-based resin, a polyester-based resin, a polyvinylchloride-based resin, polyacetic acid vinyl-based resin, a cellulose-based resin, a polyamide-based resin, a polypropylene-based resin, a polystyrene-based resin, and an acrylic resin such as a polymethyl metacrylate, poly ridoxylethyl metacrylate, and polycyclohexylmethacrylate.

The micro lens array may further include: a light absorbing layer formed at a focal region of each of the lens units.

According to another aspect of the present invention, there is provided a method of fabricating a micro lens array, the method including: forming a plurality of holes through a substrate; placing a second surface of the substrate into contact with a light transmitting high-polymer solution; causing the high-polymer solution to protrude onto a first surface of the substrate through the plurality of holes and to form lens shapes, and curing the protruding high-polymer solution lens shapes to form lens units; and separating the high-polymer solution from the second surface of the substrate.

The forming of the plurality of holes may further include: forming a light absorbing layer on the second surface of the substrate opposite the first surface, except where the holes penetrate the substrate.

In the forming of the plurality of holes, the plurality of holes, each of which may have a diameter ranging from about 1 μm to 50 μm, may be formed with intervals between about 2-5 times greater than the diameter of the holes.

The high-polymer solution may include at least one selected from a group consisting of a polyurethane-based resin, a polyester-based resin, a polyvinylchloride-based resin, polyacetic acid vinyl-based resin, a cellulose-based resin, a polyamide-based resin, a polypropylene-based resin, a polystyrene-based resin, and an acrylic resin such as a polymethyl metacrylate, poly ridoxylethyl metacrylate, and polycyclohexylmethacrylate.

The high-polymer solution may further include a light polymerization initiator.

In the curing of the high-polymer solution, a heating or light irradiating process may be performed to cure the high-polymer solution.

In the separating of the high-polymer solution from the substrate, a process of planarizing the second surface of the substrate may be performed after separating the high-polymer solution from the substrate.

The method may further include: forming a recess at a focal point of each of the lens units by etching each hole on the first surface of the substrate; and forming the light absorbing layer in the recesses.

The light absorbing layer may be formed of a material including graphite.

The causing may include either pressing the substrate into a quantity of the high-polymer solution or pressing the high-polymer solution through the holes.

The causing may include pressing the high-polymer solution through the holes, and includes pressing the high-polymer solution through the holes with a blade.

The lens shapes may be calculable by following equation:

$$P_0 + gZ = \gamma\left(\frac{1}{R_1} + \frac{1}{R_2}\right).$$

where, $P_0$ is a pressure pushing the high-polymer solution, gZ is gravity, γ is a surface tension of the high-polymer solution, and $R_1$ and $R_2$ denote cross curvatures at an apex of the lens shape.

According to another aspect of the present invention, there is provided a method of increasing a viewing angle and/or a contrast ratio of a display device, including: providing a micro lens array including substrate having a plurality of holes penetrating therethrough, a light absorbing layer, and a plurality of lens units on the substrate, each lens unit having a focus and being at a respective one of the holes; discharging light emitted from within a display device out of the substrate through the foci; and absorbing light incident onto the substrate from an outside of the display by the light absorbing layer, except for the light incident at the holes.

According to another aspect of the present invention, there is provided a method of forming a one-way optical film, including: providing a substrate having a plurality of holes penetrating therethrough and a plurality of lens units on a first surface of the substrate, each lens being at a respective one of the holes; forming a recess at a focal region of each of the lens units by etching holes on a second surface of the substrate opposite the first surface at each of the holes; and forming a light absorbing layer on the second surface of the substrate and then removing the light absorbing layer in such a manner that portions of the light absorbing layer remain in the recesses.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
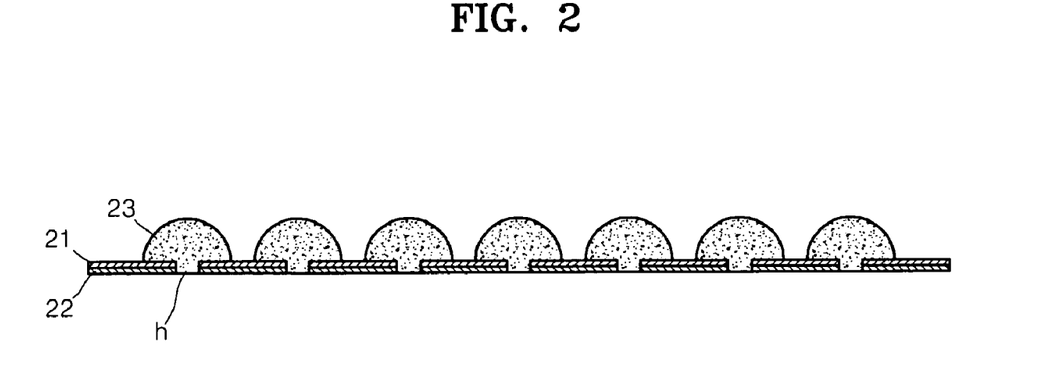
FIG. 2 is a cross-sectional view of a micro lens array according to an embodiment of the present invention.

FIG. 2 is a cross-sectional view of a micro lens array according to an embodiment of the present invention. Referring to FIG. 2, the micro lens array according to the present embodiment includes a substrate 21, a plurality of holes (h) penetrating the substrate 21 at predetermined intervals, and a plurality of lens units 23 on a first surface of the substrate 21 at each of the holes h. In addition, the micro lens array can further include a light absorbing surface 22 formed on a second surface of the substrate 21 except for the regions where the holes h are formed.

In the micro lens array of the present embodiment, the substrate 21 can be any material that is conventionally used as the substrate of a micro lens array. As non-limiting examples, the substrate 21 can be a glass or a polymer resin. A thickness of the substrate 21 can be controlled within a few μm according to, for example, the intended usage and/or specific application of the micro lens array.

The lens units 23 can be formed any material that is conventionally used to form a micro lens, has a light transmittance, and can be cured by heat or ultraviolet ray. In more detail, the lens units 23 can be formed of a single or a combined thermoplastic resin or heat-curing resin such as, by way of non-limiting examples, light transmitting resins such as a polyurethane-based resin, a polyester-based resin, a polyvinylchloride-based resin, polyacetic acid vinyl-based resin, a cellulose-based resin, a polyamide-based resin, a polypropylene-based resin, a polystyrene-based resin, and acrylic resins such as a polymethyl metacrylate, poly ridoxylethyl metacrylate, and polycyclohexylmethacrylate. Benzoin ethers, benzophenone/amine-based ultraviolet light polymerization initiator, an acetophenones ultraviolet light polymerization initiator, or thioxanthone-based ultraviolet light polymerization initiator can be mixed with the light transmitting resin. In addition, a visible light polymerization initiator such as camphorquinone, alpha-naphthol, benzyl, 2,4-diethyl thioxanthone, or trimethylbenzoyl diphenyl sulfine oxide can be mixed with the micro lens material to add a light-curing property to the material.

The light absorbing layer 22 is formed to absorb the visible light, and can be formed using graphite, as a non-limiting example.

Sizes and arrangements of the holes h formed in the substrate 21 can be controlled according to, for example, the intended usage and/or specific application of the micro lens array. As a non-limiting example, each of the holes h can be formed to have a size (diameter) ranging from about 1 μm to 50 μm. In addition, the interval between the holes h may be between 2-5 times greater than the diameter of the holes h.

FIGS. 3A through 3G are views illustrating a method of fabricating the micro lens array according to an embodiment of the present invention.

Figure 3A:
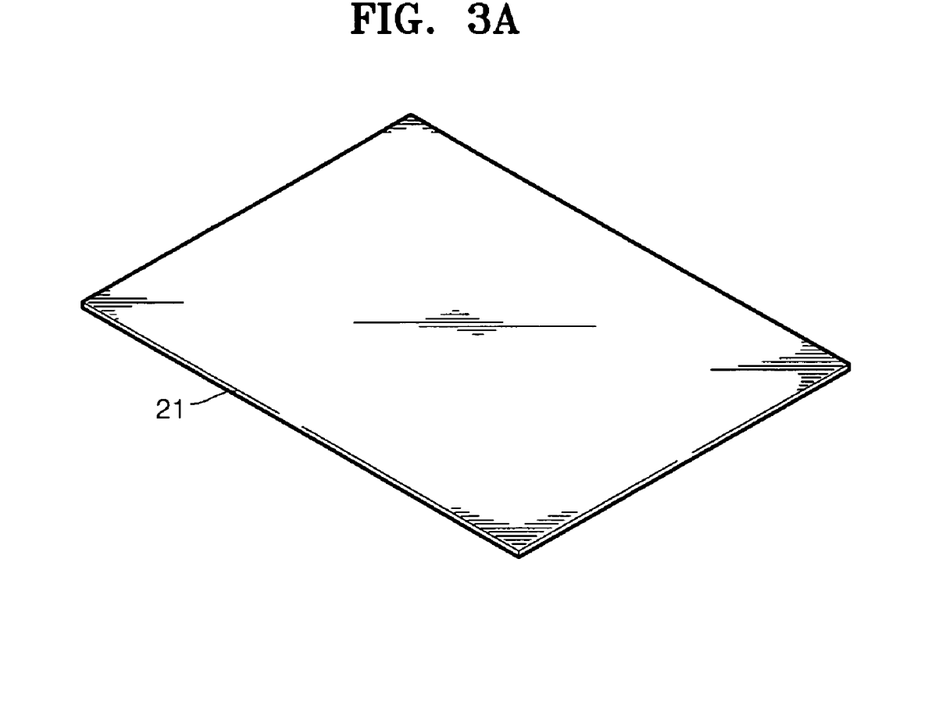
FIGS. 3A through 3G are views illustrating a method of fabricating a micro lens array according to an embodiment of the present invention.

Referring to FIG. 3A, a substrate 21 is prepared. The substrate 21 can be formed of any material that is conventionally used in a fabrication processes of a micro lens array. As non-limiting examples, a glass substrate or a high-polymer compound substrate can be used as the substrate 21. In addition, according to the intended usage and/or application of the micro lens array, a light transmitting material or non-transmitting material can be selective used to form the substrate 21. The thickness of the substrate 21 can be controlled within a few mm according to the intended usage of the substrate 21.

Figure 3B:
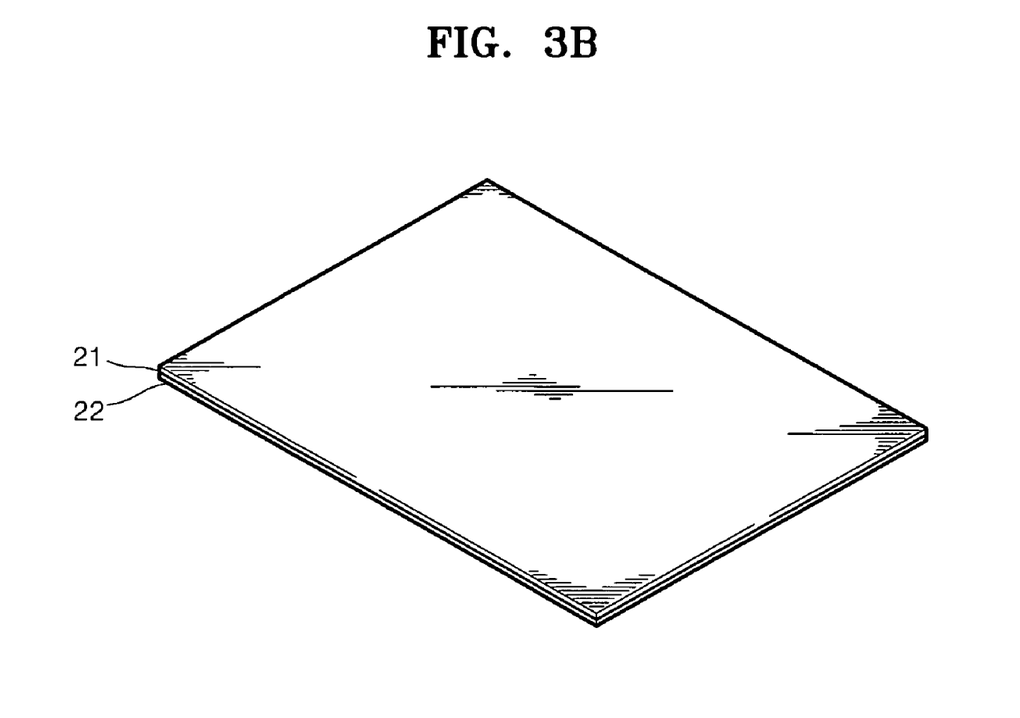

Referring to FIG. 3B, if the substrate 21 is the light-transmitting substrate, or the lens unit is formed of a light-curing material, the light absorbing layer 22 is further formed on a surface of the substrate 21. The light absorbing layer 22 is formed of a material having high light absorbing rate such as, by way of a non-limiting example, graphite.

Figure 3C:
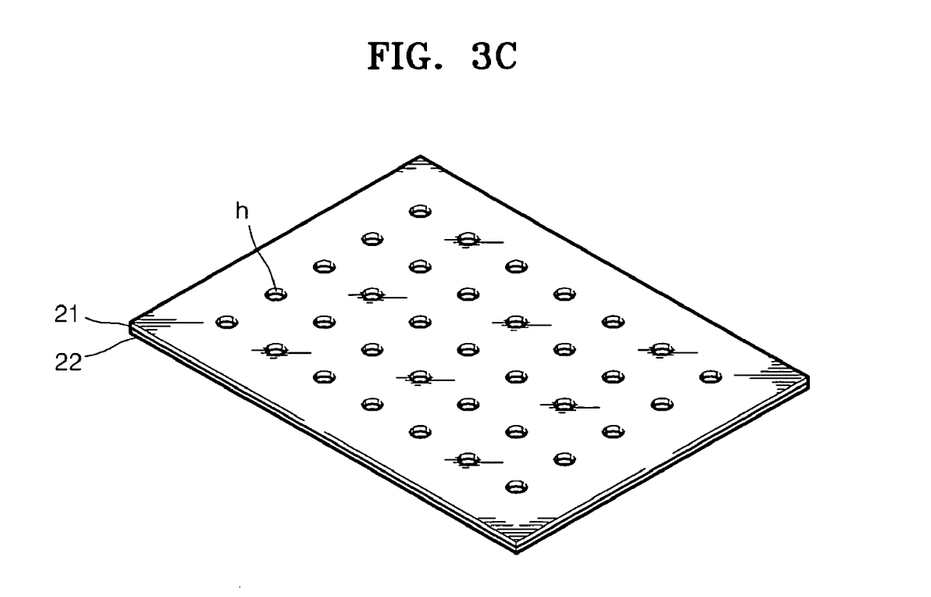

Referring to FIG. 3C, holes h are formed in the substrate 21 with predetermined sizes and at predetermined intervals. The size of the holes h and the interval (distribution) of the holes h can be controlled based on, for example, the intended usage and/or application of the micro lens array. In more detail, the holes h can be formed to have a diameter ranging from 1 μm through 50 μm. In addition, the interval between the holes h may be about 2-5 times greater than the diameter of the holes h. The holes h can be formed using a physical process such as, by way of a non-limiting example, a punching method, melting the substrate 21 by irradiating a laser beam onto the substrate, or using a chemical etching method to etch a pattern. The holes h can be formed after forming the light absorbing layer 22 or, in the alternative, the holes h can be selectively formed in the substrate 21 in advance, and then, the light absorbing layer can be formed on a surface of the substrate 21.

Figure 3D:
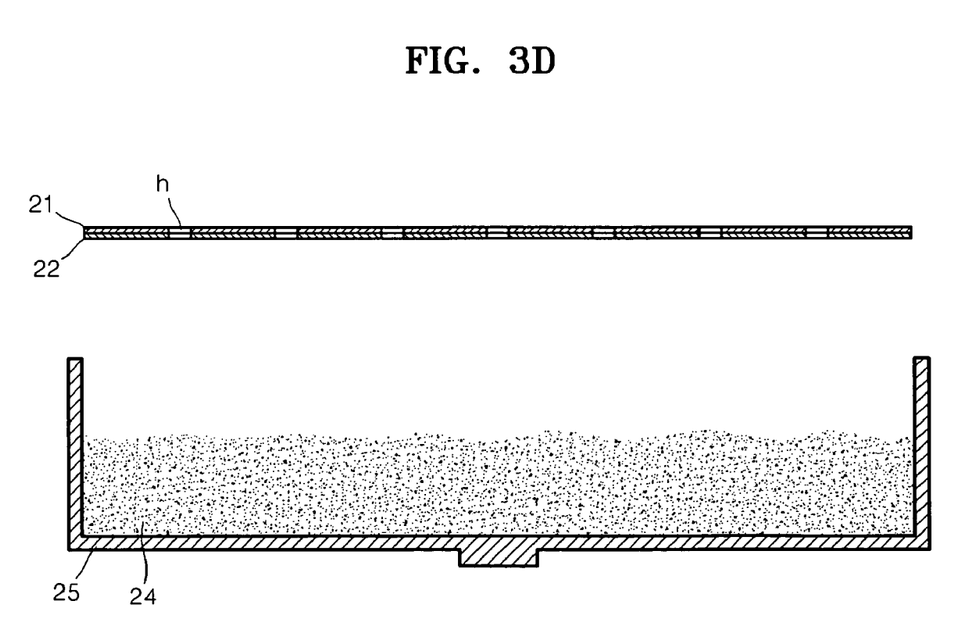

Referring to FIG. 3D, the substrate 21 is located above a container 25 including a high-polymer solution 24 that is a material for forming the lens unit. The high-polymer solution 24 has a light transmitting property, and is cured by heat or light irradiation such as ultraviolet rays. In more detail, single or combined thermoplastic resin or heat-curing resin, for example, a polyurethane-based resin, a polyester-based resin, a polyvinylchloride-based resin, polyacetic acid vinyl-based resin, a cellulose-based resin, a polyamide-based resin, a polypropylene-based resin, a polystyrene-based resin, and acrylic resins such as a polymethyl metacrylate, poly ridoxylethyl metacrylate, and polycyclohexylmethacrylate, can be used as the high-polymer solution 24. Benzoin ethers, benzophenone/amine-based ultraviolet light polymerization initiator, an acetophenones ultraviolet light polymerization initiator, or thioxanthone-based ultraviolet light polymerization initiator can be mixed with the light transmitting resin. In addition, a light polimerization initiator such as camphorquinone, alpha-naphthol, benzyl, 2,4-diethyl thioxantone, or trimethylbenzoyl diphenyl sulfine oxide can be mixed with the light transmitting resin.

Figure 3E:
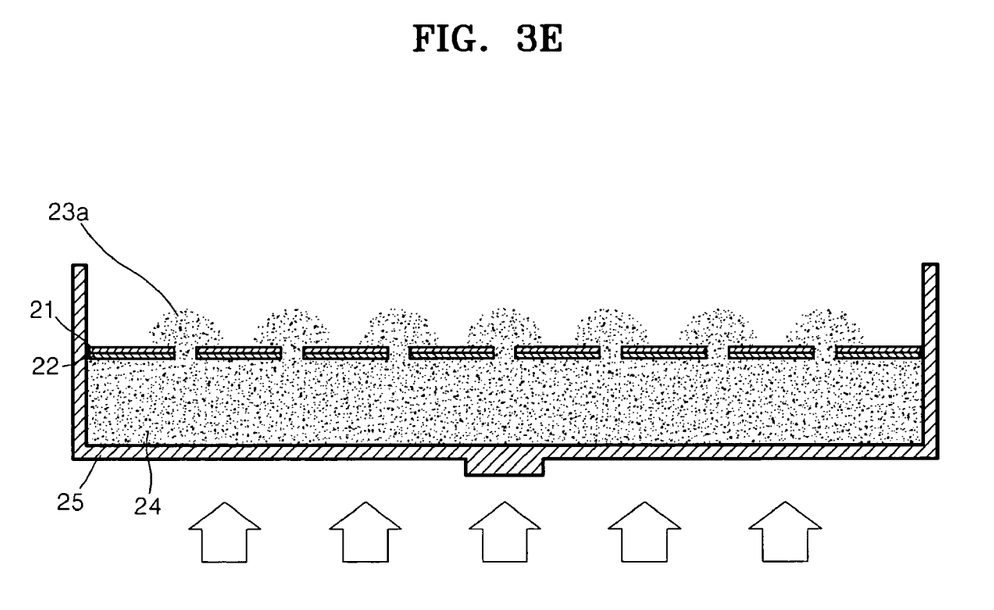
Figure 5:
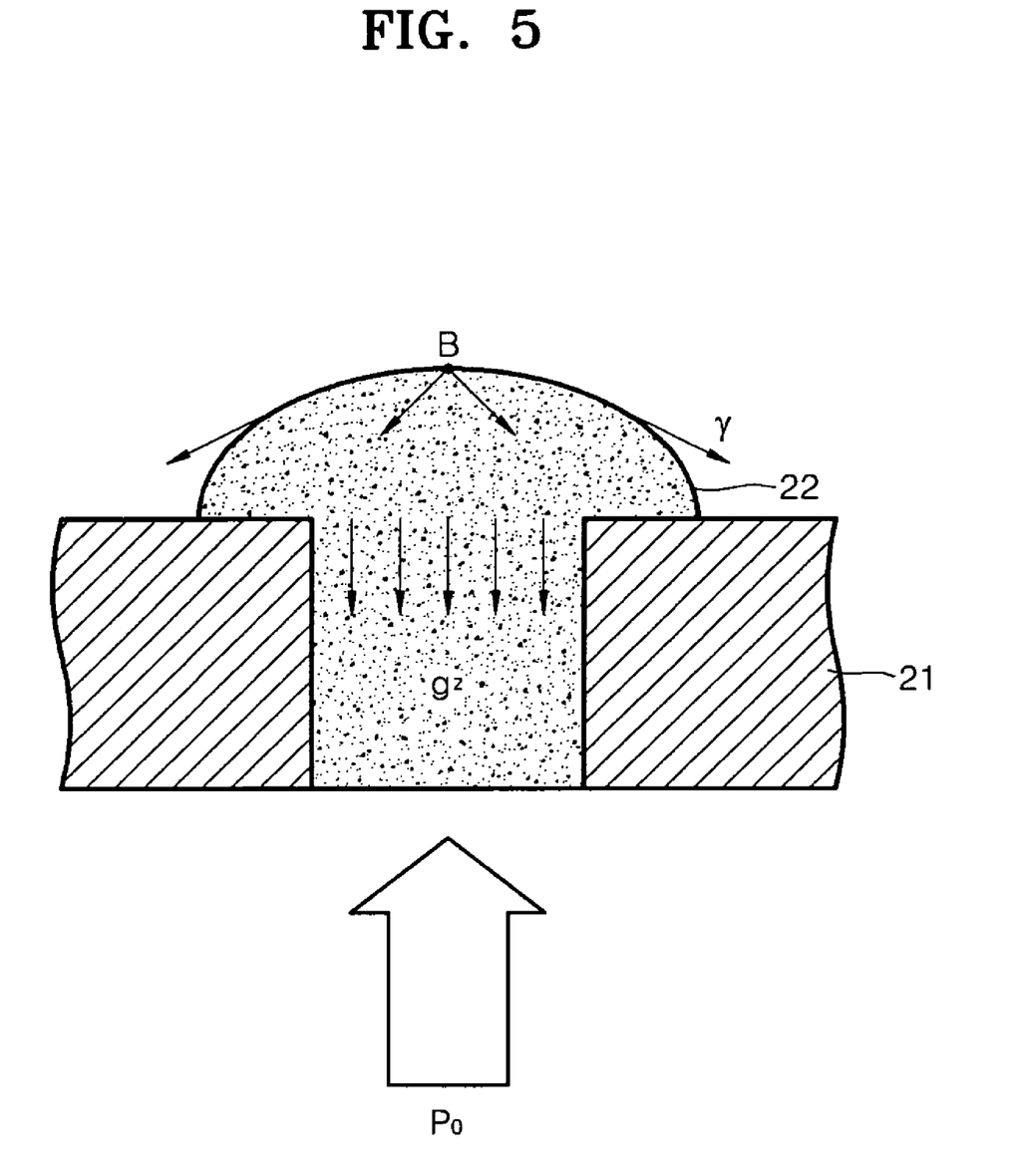
FIG. 5 is a view of a shape of the micro lens array according to the embodiment of the present invention.

Referring to FIG. 3E, the substrate 21 including the holes h is compressed into the high-polymer solution 24 in the container 25. As a result, the high-polymer solution 23a protrudes out of the holes h of the substrate 21 in lens shapes as shown in FIG. 3E. Referring to FIGS. 3E and 5, the shape of the high-polymer solution 23a protruding at each holes h is determined by a pressure pushing the high-polymer solution 23a from the lower portion, gravity applied to the high-polymer solution 23a, and a surface tension of the liquid. In more detail, the shape of the high-polymer solution 23a is determined by following equation:

$$P_0 + gZ = \gamma\left(\frac{1}{R_1} + \frac{1}{R_2}\right). \quad (1)$$

Here, $P_0$ denotes the pressure pushing the high-polymer solution 23a, gZ denotes gravity, and γ denotes the surface tension. In addition, $R_1$ and $R_2$ denote cross curvatures at point B at the apex of the surface of the high-polymer solution 23a. Therefore, the shape of the high-polymer solution 23a protruding through the holes h can be formed into the desired shape.

Figure 3F:
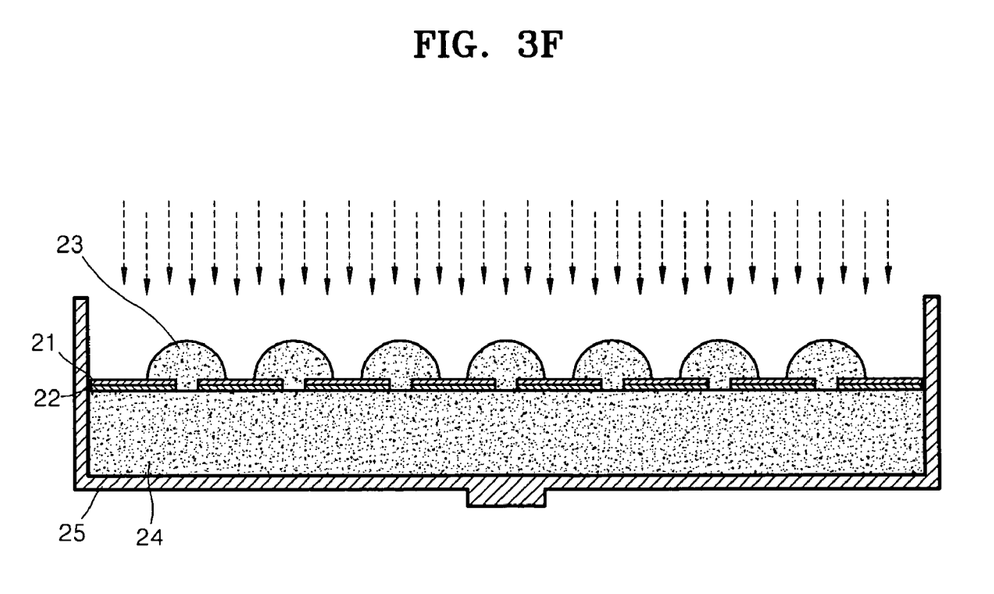

Referring to FIG. 3F, after forming the protruding high-polymer solution 23a on the holes h of the substrate 21, the protruding high-polymer solution 23a is hardened. The curing process can be selectively performed according to the kind of the high-polymer solution 23a. If the high-polymer solution 23a is the heat-curing material, the temperature is controlled to harden the high-polymer solution 23a, and if the high-polymer solution 23a is the light-curing material, a light beam such as ultraviolet (UV) ray or the visible ray is irradiated onto the solution 23a. However, if the heat-curing process is performed, the high-polymer solution 24 under the substrate 21 can be hardened, and thus, the light-curing process may be performed using the light-curing material or using the light polymerization initiator. Therefore, the high-polymer solution 23a protruding out of the holes h is hardened and forms the lens units 23. In the UV curing process, the UV ray is irradiated onto the high-polymer solution 23a for a few seconds. In addition, in an electron beam curing process, the curing process is performed in the room temperature. In a case where the curing process is performed using UV ray and the heat, the UV ray can be irradiated for between about 1-10 seconds under a temperature of 120° C.

Figure 3G:
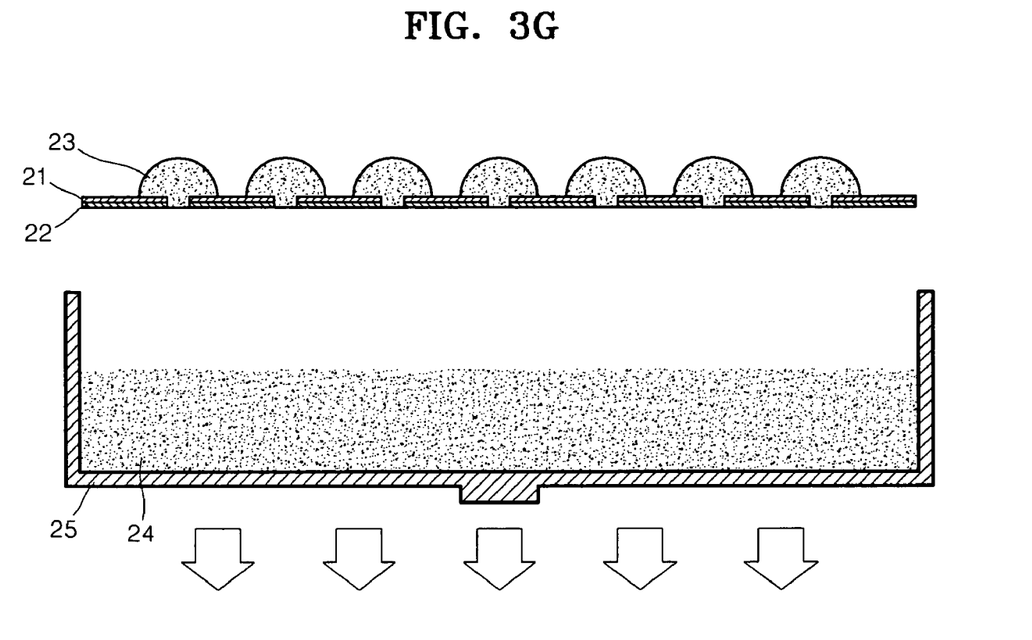

Referring to FIG. 3G, the substrate 21, on which the lens units 23 are formed, is separated from the container 25 to complete the fabrication process of the micro lens array. Since there may be the cured high-polymer material on the opposite surface of the substrate 21, on which the lens units 23 are not formed, a process of planarizing the surface of the substrate 21 or the surface of the light absorbing layer 22 can be further performed using, by way of a non-limiting example, a chemical mechanical polishing (CMP) method.

Figure 4:
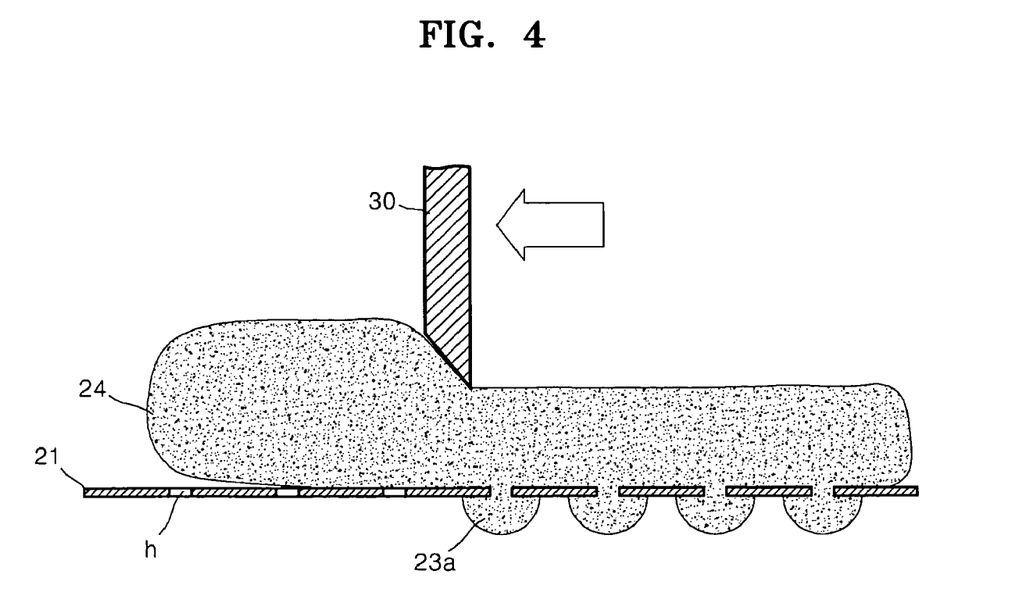
FIG. 4 is a view illustrating processes of forming high-polymer solution on a substrate and pressing the solution to form lens units under holes of the substrate.

FIG. 4 is a view illustrating a process of forming the high-polymer solution 23a under the holes h of the substrate 21 by applying the high-polymer solution 24 on the substrate 21 and pressing the solution 24 using a blade 30. The above processes of forming the high-polymer solution 23a can be selectively performed.

Figure 6:
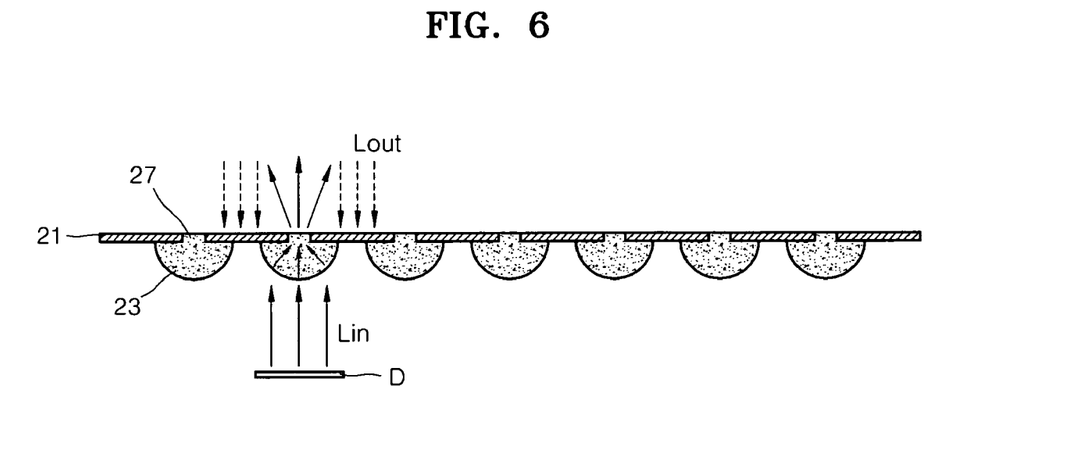
FIG. 6 is a view of illustrating operating principle of the micro lens array according to the embodiment of the present invention.

FIG. 6 is a cross-sectional view illustrating an operating principle of the micro lens array according to the embodiment of the present invention. Referring to FIG. 6, the light (Lin) emitted from a display device (D) onto the substrate 21 is discharged out of the substrate 21 through a focus 27 formed at each hole h in each micro lens units 23. However, external light (Lout) incident from the outside of the display D onto the substrate 21 is almost totally absorbed by the light absorbing layer (not shown) formed on the substrate 21, except for the light incident onto the holes h. As a result, little of the light (Lout) is reflected. Therefore, most of the light (Lin) emitted from the display device (D) can be recognized by the viewer, however, the external light is absorbed by the light absorbing layer on the substrate 21 and the viewer hardly recognize the external light reflected by the substrate 21. As described above, the micro lens array according to the present embodiment can be applied to a display unit of image and optical apparatuses such as projection TVs. In addition, the micro lens array of the present embodiment can be used as a one-way optical film that transmits the light only in a single direction.

FIGS. 7A through 7E are views illustrating processes of forming a one-way optical film transmitting the light in the opposite direction to that of FIG. 2 using the micro lens array according to the embodiment of the present invention.

Figure 7A:
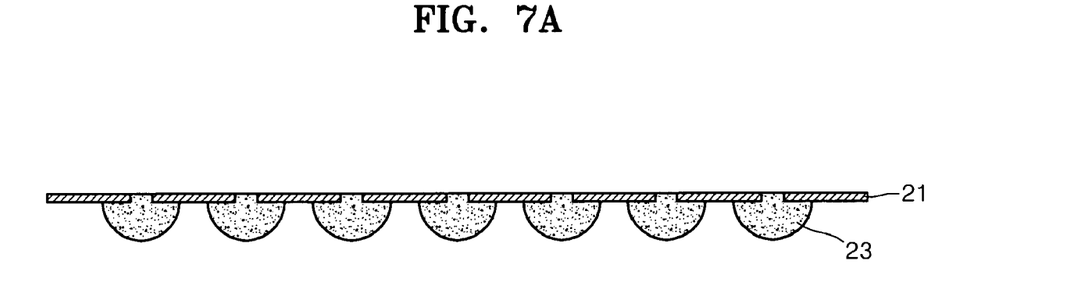
FIGS. 7A through 7E are views illustrating a process of forming a one-way optical device using the micro lens array according to the embodiment of the present invention.

Referring to FIG. 7A, the micro lens array according to the embodiment of the present invention is prepared. The substrate 21 is formed of the light transmitting material, and the lens units 23 are formed on a surface of the substrate 21.

Figure 7B:
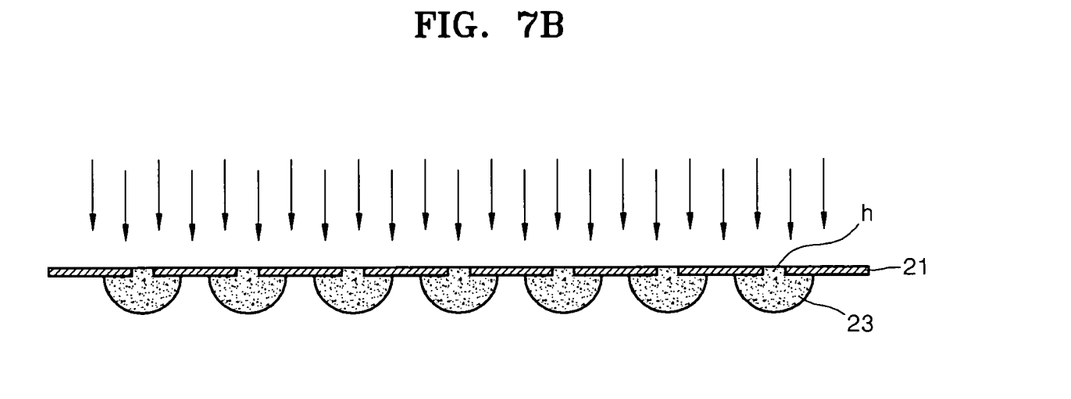

Referring to FIG. 7B, a chemical etching process or a plasma etching process is performed with respect to the holes h on the surface of the substrate 21, on which the lens units 23 are not formed. Here, a mask may be located on the upper portion of the substrate 21 for performing the etching process.

Figure 7C:
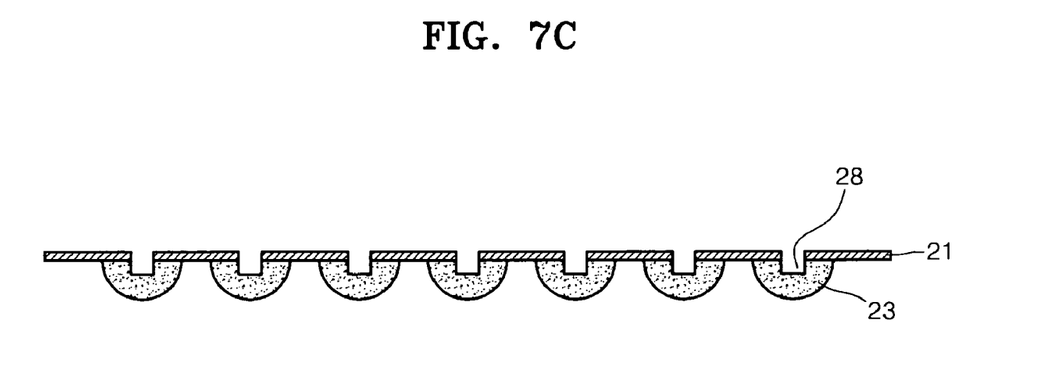

Referring to FIG. 7C, a recess 28 is formed at a focal region of each of the lens units 23 by the etching process. The etching process of FIG. 6B is performed to remove material at the focal regions of the lens units 23.

Figure 7D:
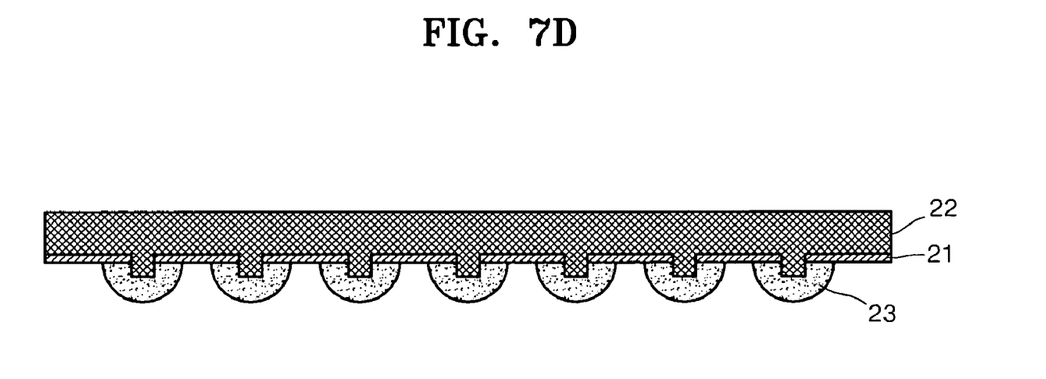

Referring to FIG. 7D, the light absorbing layer 22 is formed on the surface of the substrate 21, on which the lens units 23 are not formed. The light absorbing layer 22 is formed of a material having high light absorbing property such, by way of a non-limiting example, as graphite.

Figure 7E:
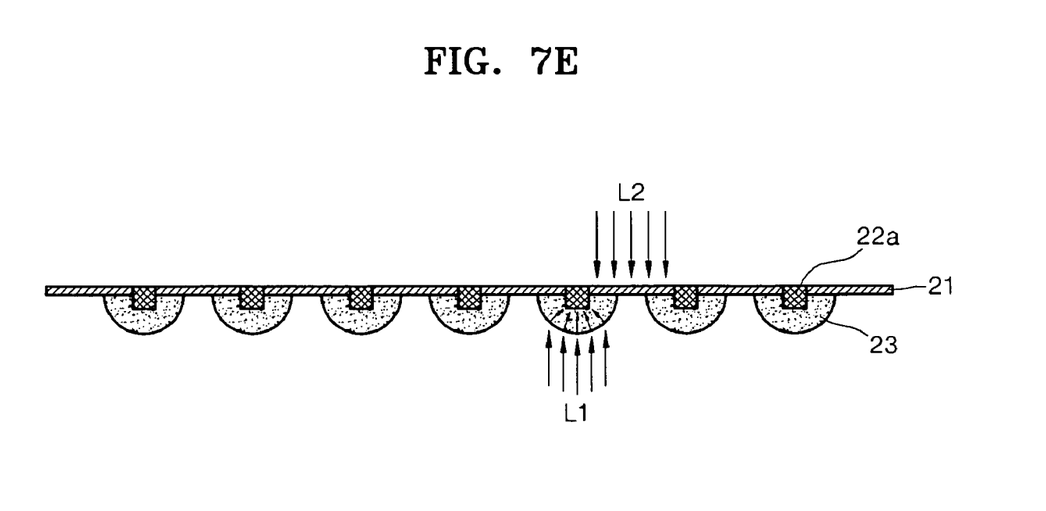

Referring to FIG. 7E, the light absorbing layer 22 formed on the substrate 21 is removed. Therefore, the light absorbing layer 22 remains in the recesses 28 shown in FIG. 7C. Then, the light (L1) incident toward the lens units 23 cannot pass through the substrate 21 due to the light absorbing layer 22a remaining at the focal region of each of the lens units 23. However, the light (L2) incident onto the surface of the substrate 21, on which the lens units 23 are not formed, can pass through the substrate 21 through the portions except for the light absorbing layer 22a. Therefore, the micro lens array having the above structure can be used as the one-way optical film in various fields, as well as in the displays.

According to the micro lens array of the present invention, the contrast ratio can be improved. In addition, the micro lens array transmitting the light in a single direction can be provided.

Also, the shape of the micro lens can be controlled easily since the surface tension of the high-polymer solution is used to fabricate the micro lens array.

In addition, the hole formed in the substrate and the center of the micro lens can correspond to each other precisely, and thus, superior optical properties in single direction can be obtained.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A micro lens array comprising:
   a substrate;
   a plurality of holes penetrating through the substrate, the holes comprising a vertical wall extending from a first side of the substrate to a second side of the substrate; and
   a plurality of lens units on a first surface of the substrate, each lens being at a respective one of the plurality of holes and comprising a curved side and a flat side.

2. A micro lens array comprising:
   a substrate;
   a plurality of holes penetrating through the substrate; and
   a plurality of lens units on a first surface of the substrate, each lens being at a respective one of the plurality of holes, further comprising a light absorbing layer on a second surface of the substrate opposite the first surface, except where the holes penetrate the substrate.

3. A micro lens array comprising:
   a substrate;
   a plurality of holes penetrating through the substrate; and
   a plurality of lens units on a first surface of the substrate, each lens being at a respective one of the plurality of holes, wherein each of the holes has a diameter ranging from about 1 μm to 50 μm.

4. The micro lens array of claim 3, wherein an interval between the holes is about 2-5 times greater than the diameter of each of the holes.

5. A micro lens array comprising:
   a substrate;
   a plurality of holes penetrating through the substrate; and
   a plurality of lens units on a first surface of the substrate, each lens being at a respective one of the plurality of holes,
   wherein the lens unit is formed of at least one selected from a group consisting of a polyurethane-based resin, a polyester-based resin, a polyvinylchloride-based resin, polyacetic acid vinyl-based resin, a cellulose-based resin, a polyamide-based resin, a polypropylene-based resin, a polystyrene-based resin, and an acrylic resin such as a polymethyl metacrylate, poly ridoxylethyl metacrylate, and polycyclohexylmethacrylate.

6. A micro lens array comprising:
   a substrate;
   a plurality of holes penetrating through the substrate; and
   a plurality of lens units on a first surface of the substrate, each lens being at a respective one of the plurality of holes, further comprising a light absorbing layer at a focal region of each of the lens units.

7. A method of fabricating a micro lens array, the method comprising:
   forming a plurality of holes through a substrate;
   placing a second surface of the substrate into contact with a light transmitting high-polymer solution;
   causing the high-polymer solution to protrude onto a first surface of the substrate through the plurality of holes and to form lens shapes, and curing the protruding high-polymer solution lens shapes to form lens units; and
   separating the high-polymer solution from the second surface of the substrate.

8. The method of claim 7, wherein the forming a plurality of holes further comprises forming a light absorbing layer on the second surface of the substrate opposite the first surface, except where the holes penetrate the substrate.

9. The method of claim 7, wherein, in the forming a plurality of holes, the plurality of holes, each of which has a diameter ranging from about 1 μm to 50 μm, are formed at intervals about 2-5 times greater than the diameter of the holes.

10. The method of claim 7, wherein the high-polymer solution includes at least one selected from a group consisting of a polyurethane-based resin, a polyester-based resin, a polyvinylchloride-based resin, polyacetic acid vinyl-based resin, a cellulose-based resin, a polyamide-based resin, a polypropylene-based resin, a polystyrene-based resin, and an acrylic resin such as a polymethyl metacrylate, poly ridoxylethyl metacrylate, and polycyclohexylmethacrylate.

11. The method of claim 10, wherein the high-polymer solution further includes a light polymerization initiator.

12. The method of claim 7, wherein, in the curing the high-polymer solution, a heating or light irradiating process is performed to cure the high-polymer solution.

13. The method of claim 7, wherein, in the separating the high-polymer solution, the second surface of the substrate is planarized after the high-polymer solution is separated from the substrate.

14. The method of claim 7, further comprising:
   forming a recess at a focal point of each of the lens units by etching each hole on the first surface of the substrate; and
   forming the light absorbing layer in the recesses.

15. The method of claim 7, wherein the light absorbing layer is a material including graphite.

16. The method of claim 14, wherein the light absorbing layer is a material including graphite.

17. The method of claim 7, wherein the causing comprises either pressing the substrate into a quantity of the high-polymer solution or pressing the high-polymer solution through the holes.

18. The method of claim 17, wherein the causing comprises pressing the high-polymer solution through the holes, and includes pressing the high-polymer solution through the holes with a blade.

19. The method of claim 7, wherein the lens shapes are calculable by following equation:

$$P_0 + gZ = \gamma\left(\frac{1}{R_1} + \frac{1}{R_2}\right), \text{ and}$$

wherein, $P_0$ is a pressure pushing the high-polymer solution, gZ is gravity, $\gamma$ is a surface tension of the high-polymer solution, and $R_1$ and $R_2$ denote cross curvatures at an apex of the lens shape.

20. A method of increasing a viewing angle and/or a contrast ratio of a display device, comprising:
providing a micro lens array including substrate having a plurality of holes penetrating therethrough, a light absorbing layer, and a plurality of lens units on the substrate, each lens unit having a focus and being at a respective one of the holes;
discharging light emitted from within a display device out of the substrate through the foci; and
absorbing light incident onto the substrate from an outside of the display by the light absorbing layer, except for the light incident at the holes.

21. A method of forming a one-way optical film, comprising:
providing a substrate having a plurality of holes penetrating therethrough and a plurality of lens units on a first surface of the substrate, each lens being at a respective one of the holes;
forming a recess at a focal region of each of the lens units by etching holes on a second surface of the substrate opposite the first surface at each of the holes; and
forming a light absorbing layer on the second surface of the substrate and then removing the light absorbing layer in such a manner that portions of the light absorbing layer remain in the recesses.

* * * * *

UNITED STATES PATENT AND TRADEMARK OFFICE
CERTIFICATE OF CORRECTION

PATENT NO. : 7,580,190 B2  
APPLICATION NO. : 11/448113  
DATED : August 25, 2009  
INVENTOR(S) : Kwang-hee Kim et al.

It is certified that error appears in the above-identified patent and that said Letters Patent is hereby corrected as shown below:

Column 8, Line 10, change "metacrylate, poly ridoxylethyl metacrylate," to --methacrylate, polyridoxylethyl methacrylate,--.

Column 8, Lines 45-46, change "metacrylate, poly ridoxylethyl metacrylate," to --methacrylate, polyridoxylethyl methacrylate,--.

Signed and Sealed this

Twenty-fourth Day of November, 2009

David J. Kappos
*Director of the United States Patent and Trademark Office*